(12) United States Patent
Milius et al.

(10) Patent No.: US 6,300,298 B1
(45) Date of Patent: *Oct. 9, 2001

(54) ANTIFOAM COMPOSITIONS AND INTERMEDIATE ANHYDROUS COMPOSITIONS

(75) Inventors: Alain Milius, Nice; Jean-Pierre Boiteux, Saix; Maryse Carrausse, Castres, all of (FR)

(73) Assignee: Societe d'Exploitation de Produits pour les Industries Chimiques Seppic, Paris Cedex (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/284,846

(22) PCT Filed: Oct. 15, 1997

(86) PCT No.: PCT/FR97/01840

§ 371 Date: May 24, 1999

§ 102(e) Date: May 24, 1999

(87) PCT Pub. No.: WO98/17379

PCT Pub. Date: Apr. 30, 1998

(30) Foreign Application Priority Data

Oct. 22, 1996 (FR) .................................................. 96 12819

(51) Int. Cl.$^7$ ............................ C11D 3/075; C11D 1/72; B01F 17/42; B01D 19/04
(52) U.S. Cl. .................. 510/214; 510/218; 510/219; 510/235; 510/238; 510/470; 516/134; 516/204; 516/76
(58) Field of Search .................... 516/134, 204, 516/FOR 126, FOR 163, 76; 510/218, 219, 214, 235, 238, 506, 470, 535

(56) References Cited

U.S. PATENT DOCUMENTS

| | | | |
|---|---|---|---|
| 3,215,636 | * 11/1965 | Hagge et al. ................ | 516/134 |
| 3,640,998 | * 2/1972 | Mansfield et al. ........... | 510/470 |
| 3,954,886 | * 5/1976 | Langdon ..................... | 516/134 |
| 4,011,389 | * 3/1977 | Langdon ..................... | 510/470 |
| 4,077,894 | * 3/1978 | Langdon et al. ............. | 516/134 |
| 5,164,116 | * 11/1992 | Berkhof et al. ............. | 516/179 |
| 5,205,959 | * 4/1993 | Schmid et al. .............. | 516/134 |
| 5,866,530 | * 2/1999 | Schmid et al. .............. | 510/470 |
| 5,958,431 | * 9/1999 | Brancq et al. .............. | 424/401 |
| 6,015,839 | * 1/2000 | Milius ....................... | 516/134 |

FOREIGN PATENT DOCUMENTS

WO 91/14760  10/1991  (WO).
WO 96/33255  * 10/1996  (WO).

* cited by examiner

Primary Examiner—Daniel S. Metzmaier
(74) Attorney, Agent, or Firm—Young & Thompson

(57) ABSTRACT

Composition (A) comprising:

a) at least one compound of formula (I):

$$(Z)_y-(G)_x-O-R_A \qquad (I);$$

b) at least one compound of formula (II):

$$Z-O-[CH_2-CH(R_1)-O]_n-R_B \qquad (II);$$

c) optionally one or more compounds of formula (IV):

$$(G)_x-O-R_A \qquad (III), \text{ and}$$

d) optionally one or more compounds of formula (IV)

$$HO-[CH_2-CH(R_1)-O]_n-R_B \qquad (IV),$$

wherein the weight ratios of (I) to (II) is 0.1 to 10, (III)/(I) is 0 to 1, and (IV)/(II) is 0 to 1, and in each formula:

Z is a —CH(CH$_3$)—O—R$_2$ group, wherein R$_2$ is an aliphatic hydrocarbon radical of 1 to 30 carbons, y is greater than 0 and less than or equal to 3x+1;

x is 1 to 5;

n is 1 to 30;

R$_1$ is a hydrogen or methyl;

G is the residue of a saccharide;

R$_A$ and R$_B$ are independently a hydrocarbon radical of 1 to 30 carbons. Composition (A) has application as an antifoam in cleaning compositions.

7 Claims, No Drawings

ANTIFOAM COMPOSITIONS AND INTERMEDIATE ANHYDROUS COMPOSITIONS

FIELD OF THE INVENTION

The present invention relates to antifoaming compositions and to intermediate anhydrous compositions.

BACKGROUND OF THE INVENTION

Some industrial cleaning operations, such as the cleaning of bottles or cleaning in place, can result in the formation of a significant degree of foam. It is due in particular to the presence of food stains or of sticky residues present on the bottles. For the purpose of decreasing or even preventing the formation of this foam, it is known to add one or more defoaming surfactants to the cleaning composition. These defoaming surfactants are generally of the non-ionic type.

One of the subject-matters of the present invention consists of novel surfactant compositions which are derived from alkylpolyglycosides.

Alkylpolyglycosides are well-known non-ionic surfactants. Their manufacturing process is disclosed, for example, in Patent Application EP-A-0 077 167.

However, to date, it is impossible to use surfactant compositions based on alkylpolyglycosides which are devoid of water or devoid of fatty alcohol. This is because the very high melting temperatures of alkylpolyglycosides do not allow them to be handled in anhydrous form. They are therefore diluted in water or presented as a mixture with one or more fatty alcohols.

Patent Application EP-A-0 489 777 discloses antifoaming compositions comprising alkylpolyglycosides in which the alkyl chain comprises from 6 to 12 carbon atoms.

German Patent Application No. DE 38 35 199 discloses alkylpolyglycosides blocked by an arylmethyl or alkyl radical exhibiting antifoaming properties.

However, it is clear to a person skilled in the art that the blocking reaction employed in this publication cannot be applied to the many blocking reagents which decompose in water. In another aspect of the present invention, the Applicant Company has therefore sought to develop a novel blocking process which involves anhydrous intermediates which are devoid of fatty alcohols.

SUMMARY OF THE INVENTION

The subject-matter of the invention is therefore the composition (A) comprising:

a) at least one compound of formula (I):

$(Z)_y$—$(G)_x$—O—$R_A$      (I);

b) at least one compound of formula (II):

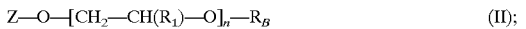
Z—O—[$CH_2$—$CH(R_1)$—O]$_n$—$R_B$      (II);

c) optionally one or more compounds of formula (III):

$(G)_x$—O—$R_A$      (III), and d) optionally one or more compounds of formula (IV)

HO—[$CH_2$—$CH(R_1)$—O]$_n$—$R_B$      (IV), such that the ratio by weight of the compound of formula (I) to the compound of formula (II) is between 0.1 and 10, the ratio by weight: compound of formula (III)/compound of formula (I) is between 0 and 1, and the ratio by weight: compound of formula (IV)/compound of formula (II) is between 0 and 1, in which formulae (I), (II), (III) and (IV):

Z represents:
  either a —$CH(CH_3)$—O—$R_2$ group, in which $R_2$ represents a saturated or unsaturated, linear or branched, aliphatic hydrocarbon-comprising radical comprising from 1 to 30 carbon atoms,
  or a —$CH_2$—$CH(OH)$—$R_3$ radical, in which $R_3$ represents a
  linear or branched alkyl radical comprising from 1 to 4 carbon atoms;
y represents a decimal number of greater than 0 and less than or equal to 3x+1;
x represents a decimal number of between 1 and 5;
n is an integer of between 1 and 30;
$R_1$ represents a hydrogen atom or a methyl radical;
G represent the residue of a saccharide;
$R_A$ and $R_B$ represent, independently of one another, a saturated or unsaturated, linear or branched, hydrocarbon-comprising radical comprising from 1 to 30 carbon atoms.

DETAILED DESCRIPTION OF THE INVENTION

When Z represents a —$CH(CH_3)$—$OR_2$ group, it is in particular the 1-methoxyethyl, 1-ethoxyethyl, 1-propoxyethyl, 1-isopropoxyethyl, 1-butoxyethyl, 1-isobutoxyethyl, 1-(pentyloxy)ethyl, 1-(dodecyloxy) ethyl or 1-(octadecyloxy)ethyl radical.

When Z represents a —$CH_2$—$CH(OH)$—$R_3$ radical, it is in particular the 2-hydroxybutyl radical.

The term "saturated or unsaturated, linear or branched, hydrocarbon-comprising radical comprising from 1 to 30 carbon atoms" denotes in particular, for $R_A$ and/or $R_B$, alkyl radicals or alkenyl radicals.

The term "residue of a saccharide" denotes, for G, a polyvalent radical resulting from the removal from a sugar molecule, on the one hand, of a hydrogen atom of a hydroxyl group and, on the other, of the anomeric hydroxyl group.

The term "saccharide" denotes in particular glucose or dextrose, fructose, mannose, galactose, altrose, idose, arabinose, xylose, ribose, gulose, lyxose, sucrose, maltose, maltotriose, lactose, cellobiose, dextran, talose, allose, raffinose, levoglucosan, cellulose or starch.

The oligomeric structure $(G)_x$ can exist in any isomeric form, whether relating to optical isomerism, geometrical isomerism or positional isomerism; it can also represent a mixture of isomers. In the formulae (I) and (III) as defined above, the O—$R_A$ group is bonded to G via the anomeric carbon, so as to form an acetal functional group.

In the definitions of the formulae (II) and (IV), the —[$CH_2$—$CH(R_1)$—O]$_n$ group indicates that it can be either a chain composed solely of ethoxyl groups ($R_1$=H) or a chain composed solely of propoxyl groups ($R_1$=$CH_3$) or a chain composed of both ethoxyl and propoxyl groups. In the latter case, the —$CH_2CH_2O$ and —$CH_2$—$CH(CH_3)$—O fragments are distributed in a block or random manner.

In the formula (I) as defined above, the Z group or groups are bonded to $(G)_x$ via an oxygen atom of one of its hydroxyl functional groups.

When, in the composition as defined above, there are several compounds of formulae (I), (II), (III) and/or (IV), they are distinguished from one another by the definitions of $R_A$ and $R_B$ and, optionally, in the case of products of formula (I), by the values of y.

In a first preferred alternative form of the present invention, G represents the glucose residue, x, which represents the mean degree of polymerization of the saccharide, is between 1.05 and 2.5 and in particular between 1.1 and 2.0, and y is less than or equal to 2.

The composition as defined above in which the ratios by weight: compound of formula (III)/compound of formula (I) and compound [lacuna] (IV)/compound of formula (II) are equal to 0 constitutes a second preferred alternative form of the present invention; in this case, the composition therefore comprises neither compound of formula (III) nor compound of formula (IV).

In a third preferred alternative form of the present invention, n is less than or equal to 15 in the formulae (II) and (IV).

In a fourth preferred alternative form of the present invention, in the formulae (I), (II), (III) and (IV), $R_A$ and $R_B$ comprise, independently of one another, from 6 to 18 carbon atoms and represent in particular a hexyl, heptyl, octyl, nonyl, decyl, undecyl, dodecyl, tridecyl, tetradecyl, hexadecyl, octadecyl, octadecenyl, octadecadienyl or octadecatrienyl radical, the said radicals being linear or branched.

In a fifth preferred alternative form of the present invention, in the formulae (I) and (II), Z represents a 1-(octadecyloxy)ethyl, 1-isobutoxyethyl or 2-hydroxybutyl group.

A particular subject-matter of the invention is the composition as described above, comprising one or more compounds of formula (I), one or more compounds of formula (II), optionally one or more compounds of formula (III) and optionally one or more compounds of formula (IV), in which composition, in the formulae (I), (II), (III) and (IV), the substituents $R_A$ and $R_B$ are identical and represent an octyl, nonyl, decyl or 2-ethylhexyl radical.

Another subject-matter of the invention is a process for the preparation of the composition (A) as defined above, characterized in that the sugar of formula (V)

H—G—OH    (V)

is reacted in acidic medium with an excess of at least one alcohol of formula (VI)

HO—$R_A$    (VI)

in order to form the mixture (B) comprising at least one compound of formula (III) and the mixture in excess of at least one alcohol of formula (VI), to which mixture (B) is added at least one compound of formula (IV) in a ratio by weight of compounds of formula (III) to compounds of formula (IV) of between 0.1 and 10, in order to form a mixture (C), which mixture is neutralized and then subjected to a distillation stage in order to remove the excess alcohol of formula (VI) and thus to form the anhydrous composition (D) comprising at least one compound of formula (III) and at least one compound of formula (IV), which anhydrous composition (D) is reacted with a compound of formula (VII)

Z'—A    (VII)

capable of reacting with one or more hydroxyl functional groups of the $(G)_x$ group, in order to result in the composition (A).

In an alternative form of the process described above, when $R_A$ represents the radical derived from a fatty alcohol, the compound of formula (III) can be obtained by first preparing an alkylpolyglycoside with. a light alcohol, such as methanol or butanol, by etherification of the corresponding saccharide, and then, in a second stage, by carrying out a trans-etherification with the alcohol of formula (VI) and by distilling off the light alcohol.

The term "compound of formula (VII)" denotes in particular epoxides, such as, for example, butylene oxide, or alkyl vinyl ethers, such as, for example, isobutyl vinyl ether or octadecyl vinyl ether.

In a preferred alternative form of the process as described below, the substituents $R_A$ and $R_B$ are identical.

In another preferred alternative form of the process as described above, the glucose is mixed [sic] with a fatty alcohol fraction corresponding to a mixture of alcohols of formula (VI), in order to form the corresponding mixture ($B_1$) of alkylpolyglucosides of formula ($III_1$), corresponding to compounds of formula (III) in which G represents the glucose residue, and of the excess of the fatty alcohol fraction, to which mixture ($B_1$) is added a mixture of alkoxylated compounds of formula ($IV_1$), prepared from the same fatty alcohol fraction, in a ratio by weight of compounds of formula ($III_1$) to compounds of formula ($IV_1$) of between 0.2 and 5, in order to form a mixture ($C_1$), which mixture is neutralized and then subjected to a distillation in order to form the anhydrous composition ($D_1$) comprising a mixture of compounds of formula ($III_1$)

    ($III_1$), in which $G_1$ represents the glucose residue, and a mixture of alkoxylated compounds of formula ($IV_1$)

    ($IV_1$), which anhydrous composition ($D_1$) is reacted with an alkyl vinyl ether in order to form the composition ($A_1$) comprising:

a) a mixture of compounds of formula ($I_1$)

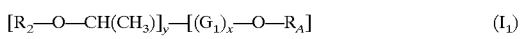    ($I_1$)

b) a mixture of compounds of formula ($II_1$)

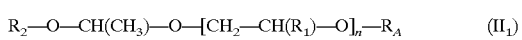    ($II_1$)

c) optionally a mixture of compounds of formula ($III_1$)

    ($III_1$), and d) optionally a mixture of compounds of formula ($IV_1$)

    ($IV_1$).

In another preferred alternative form, $D_1$ is reacted with butylene oxide in order to give the final composition ($A_2$) comprising:

a) a mixture of compounds of formulae [sic] ($I_2$)

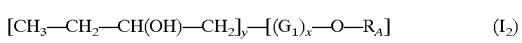    ($I_2$)

b) a mixture of compounds of formulae [sic] ($II_2$)

 ($II_2$)

c) optionally a mixture of compounds of formula ($III_1$)

    ($III_1$), and d) optionally a mixture of compounds of formula (IV₁)

The compounds of formula (VI) are known to a person skilled in the art and are commercially available. The fatty alcohol fractions are also for their part known to a person skilled in the art; some are commercially available or can be obtained according to conventional methods from natural fats or oils, such as, for example, coconut oil, palm kernel oil, palm oil, soybean oil, rapeseed oil, castor oil, beef tallow or herring oil.

The alkoxylated compounds of formulae [sic] (IV) are commercially available or obtained by the action of ethylene oxide and/or propylene oxide on the corresponding alcohols, according to conventional methods known to a person skilled in the art.

Another subject-matter of the invention is the anhydrous composition (D) and in particular the anhydrous composition (D1) which are intermediates in the process and in its alternative form which are described above.

The composition (A) which is a subject-matter of the invention is surface active and it also exhibits advantageous antifoaming properties. This property makes it possible to use it in many types of industry.

In the farm-produce industry, these products can be used in the cleaning and disinfecting of containers which may be in contact with foodstuffs; they can also be used as antifoaming agent in the extractive farm-produce industries, such as sugar refineries or starch manufacturing plants, in the fermentation industries, such as plants for production of amino acids, organic acids or enzymes, and in the livestock fodder industries.

The composition (A) according to the invention can generally be used in the cleaning of hard surfaces.

Finally, these products can be used in detergent formulations for household use, such as domestic cleansing products.

Each of the uses mentioned above represents in itself an aspect of the present invention.

An antifoaming composition according to the invention can be provided in a concentrated form or in a dilute form which is ready for use.

When it is provided in a concentrated form, it can comprise from 5 to 70% by weight of at least one compound of formula (I) and from 5 to 70% by weight of at least one compound of formula (II).

When it is provided in a dilute form, it can comprise from 0.004% to 20% by weight of at least one compound of formula (I) and from 0.004% to 20% by weight of at least one compound of formula (II).

The intermediate compositions (D) and (D₁) of the process are surface active in themselves and can also be used for this property in dilute or ready-for-use form, as is described for the composition (A).

According to another aspect of the invention, a cleaning composition comprises from 2 to 50% by weight of one or more alkaline agents, such as, for example, sodium hydroxide or potassium hydroxide, and between 001 and 10% by weight of the composition (A) as fined above.

The following examples illustrate the invention thout, however, limiting it.

EXAMPLE OF THE PREPARATION OF A COMPOSITION ACCORDING TO THE INVENTION

A) Preparation of a Composition D a) A mixture of fatty alcohols comprising 50% by weight of octanol and 50% by weight of decanol is reacted, under acid catalysis, with glucose monohydrate in a molar ratio alcohol/glucose=2.6/1. A mixture of 55% by weight of $C_8$–$C_{10}$ APG, having a degree of polymerization equal to approximately 1.9, and of 45% of free fatty alcohols is obtained.

b) A mixture of fatty alcohols comprising 50% by weight of octanol and 50% of decanol is reacted with ethylene oxide and then propylene oxide, so as to obtain, on each of the alcohols, a pentaethoxylation and then a tetrapropoxylation.

c) A mixture comprising approximately ⅓ of polyalkoxylated alcohol prepared in stage b) and ⅔ of the APG+fatty alcohol mixture prepared in stage a) is subsequently prepared; the mixture is neutralized to pH 5.6 and then the fatty alcohols are removed by distillation.

An APG/polyalkoxylated alcohols anhydrous composition ($D_{1a}$), having an OH number equal to 471, is thus obtained, which corresponds to a composition ($D_1$) in which, for the formulae (III₁) and (IV₁), G represents a glucose residue, x is equal to 1.9, $R_A$ represents an octyl radical or a decyl radical, n is equal to 9, and $R_1$ represents a hydrogen atom or a methyl radical.

By proceeding in a way analogous to Example A, from a $C_{12}$–$C_6$ alcohol fraction in a molar ratio with the glucose of 4/1 and an alkoxylation with 6 mol of ethylene oxide, the APG/polyalkoxylated alcohols anhydrous composition ($D_{1b}$) was prepared, which corresponds to a composition ($D_1$) in which, for the formulae (III₁) and (IV₁), G represents a glucose residue, x is equal to 1.45, $R_A$ represents a dodecyl radical, a tetradecyl radical or a hexadecyl radical, m is equal to 6, and $R_1$ represents a hydrogen atom.

B) Preparation of Compositions (A)

a) Blocking with alkyl vinyl ethers.

The anhydrous composition ($D_{1a}$) obtained in stage A has vinyl isobutyl ether added to it over 1 hour at 80° C., in a ratio of 0.6 mol/mole of surfactant, in the presence of a catalytic amount of concentrated phosphoric acid. After 5 hours at 110° C., the desired composition ($A_{1a}$) is obtained; OH number ($I_{OH}$)=319; cloud point (10% butyl diglycol (BDG))=57.50° C.

By proceeding in an analogous way with 0.9 mol/mole of vinyl isobutyl ether, the composition ($A_{1b}$) is obtained; $I_{OH}$=273.9; cloud point (10% BDG)=50° C.

By proceeding in an analogous way with 1.2 mol/mole of vinyl isobutyl ether, the composition ($A_{1c}$) is obtained; $I_{OH}$=231.4, cloud point (10% BDG)=41° C.

By proceeding in an analogous way with 0.6 mol/mole of vinyl octadecyl ether, the composition ($A_{1d}$) is obtained; $I_{OH}$=272.4.

b) Blocking with butylene oxide.

The reaction is carried out in the presence of sodium methoxide in methanol at 125° C. with 0.6 mol/mole of butylene oxide for 12 hours; the composition ($A_{2a}$) is obtained; $I_{OH}$=416; cloud point (1% water)=47° C.

c) Analysis of the antifoaming properties of the compositions according to the invention.

(i) various solutions were prepared comprising (% by weight):

|  |  |
|---|---|
| a surfactant composition | 0.012 |
| 10% alkaline base | 3 |
| Régilait ® powdered milk as a 10% dispersion | 7.5 |
| deionized water q.s. for | 100, |
| the alkaline base comprising (% by weight): | |
| sodium tripolyphosphate: | 3.5 |
| sodium metasilicate 5H$_2$O: | 4.2 |
| anhydrous sodium carbonate: | 2.3 |
| deionized water q.s. for | 100, |

(ii) the solution was subjected to rotary stirring for three minutes and the height of foam (in mm) formed was measured after standing for 5 seconds. The stirring was such that a similar solution, but not comprising defoaming surfactant, formed a foam with a height of 30 mm.

The following results were obtained:

| A antifoaming agent | Height of foam (mm) |
|---|---|
| A$_{1a}$ | 16 |
| A$_{1b}$ | 9 |
| A$_{1c}$ | 9 |
| A$_{1d}$ | 14 |
| A2a | 22 |
| Without antifoaming agent | 30 |

These results clearly demonstrate the anti-foaming properties of the compositions according to the invention.

What is claimed is: following new claims:

1. Composition (A) comprising:

a) at least one compound of formula (I):

$$(Z)_y\text{—}(G)_x\text{—O—}R_A \qquad (I);$$

b) at least one compound of formula (II):

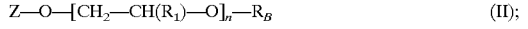

$$Z\text{—O—}[CH_2\text{—}CH(R_1)\text{—}O]_n\text{—}R_B \qquad (II);$$

c) optionally one or more compounds of formula (III):

$$(G)_x\text{—O—}R_A \qquad (III), \text{ and}$$

d) optionally one or more compounds of formula (IV):

$$HO\text{—}[CH_2\text{—}CH(R_1)\text{—}O]_n\text{—}R_B \qquad (IV),$$

such that the ratio by weight of the compound of formula (I) to the compound of formula (II) is between 0.1 and 10, the ratio by weight: compound of formula (III)/compound of formula (I) is between 0 and 1, and the ratio by weight: compound of formula (IV)/compound of formula (II) is between 0 and 1, in which formulae (I), (II), (III) and (IV):

Z represents a —CH(CH$_3$)—O—R$_2$ group, in which R$_2$ represents an aliphatic hydrocarbon radical having from 1 to 30 carbon atoms, y represents a decimal number of greater than 0 and less than or equal to 3x+1;

x represents a decimal number of between 1 and 5;

n is an integer of between 1 and 30;

R$_1$ represents a hydrogen atom or a methyl radical;

G represents the residue of a saccharide;

R$_A$ and R$_B$ represent, independently of one another, a saturated or unsaturated, linear or branched, hydrocarbon radical having from 1 to 30 carbon atoms.

2. Composition according to claim 1, in which, in the formulae (I) and (III), G represents the glucose residue, x is between 1.05 and 2.5 and y is a decimal number greater than zero and no greater than 2.

3. Composition according to claim 1, in which n is an integer from 1 to 15 in the formulae (II) and (IV).

4. Composition according to claim 1, in which, in the formulae (I), (II), (III) and (IV), R$_A$ and R$_B$ are hexyl, octyl, heptyl, nonyl, decyl, undecyl, dodecyl, tridecyl, tetradecyl, hexadecyl, octadecyl, octadecenyl, octadecadienyl or octadecatrienyl radical, the said radicals defining R$_A$ and R$_B$ being linear or branched.

5. Composition according to claim 1, wherein in formula (I) and (II), Z represents a 1-(octadecyloxy)ethyl and 1-isobutoxyethyl.

6. Composition according to claim 5, in which, in the formulae (I), (II), (III) and (IV), the substituents R$_A$ and R$_B$ are identical and represent an octyl, nonyl, decyl or 2-ethylhexyl radical.

7. Cleaning composition comprising a composition (A) as defined in claim 1 in admixture with an diluent.

* * * * *